Figure 1:
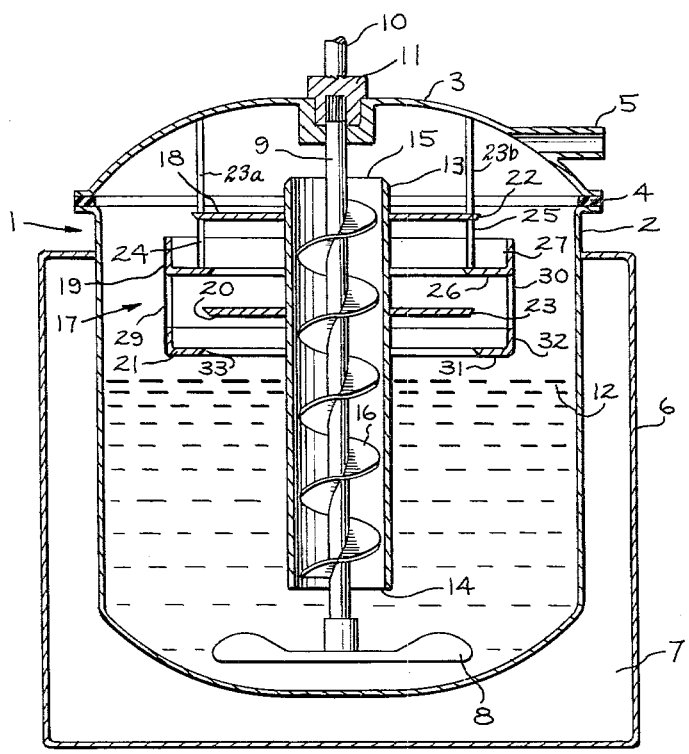

INVENTOR.
MARCUS P. HOGUE
HIS ATTORNEY

United States Patent Office 3,229,449
Patented Jan. 18, 1966

3,229,449
MIXING AND DEGASSING APPARATUS
Marcus P. Hogue, Hendersonville, N.C., assignor to General Electric Company, a corporation of New York
Filed Sept. 24, 1963, Ser. No. 311,154
6 Claims. (Cl. 55—193)

My invention relates to an apparatus for mixing and degassing epoxy resin mixtures.

Epoxy resins have found commercial success as encapsulating material for electric motors. A preferred formulation of molding compounds for use with electric motors utilizes the basic epoxy resin bisphenol A, and a mixtude of aromatic amines (m-phenylenediamine and methylenedianilene). This material not only provides a previously unattainable chemical resistance, but it also serves as the motor housing and as the bearing supports, as a dimensionally stable mechanical and chemical protector shield for the stator winding, and as a heat sink for the heat generated by the motor windings.

The wide spread use of this material has been delayed by the inability to intimately mix the constituents. The epoxy resins themselves are both crystalline and liquid. The crystalline resins are melted into a liquid before use. Due to the relatively high cost of the resins and because of the necessity of lowering the coefficient of thermal expansion thereof, inert fillers such as silica flour, calcium carbonate, and many others are used. These constituents are then mixed in the proper proportions with a liquid hardener to form a solid plastic material after curing. Many of the formulations have a consistency of soft clay or bread dough at room temperature, hence the dried flour-like fillers are added at elevated temperatures to the hot resin. Even then, the consistency or viscosity of the mixture is such as to render the mixture barely workable by hand. The mechanical process necessary for adequate mixing of the constituents causes many minute air and gas bubbles to be trapped in the mixture. In order to process the epoxy resin so that the resulting casting has the optimum strength without having unwanted voids, surface imperfections and the like, it is of primary importance to remove these minute air and gas bubbles.

It is an object of my invention to provide an improved apparatus for mixing and degassing epoxy resin mixtures.

Further objects and advantages of my invention will become apparent as the following description proceeds and the features of novelty which characterize the invention will be pointed out with particularity in the claims annexed to and forming part of this specification.

Briefly stated, in accordance with one embodiment of my invention, I provide a mixing and degassing apparatus in which the epoxy resin constituents are agitated in a heated receptacle to intimately mix them and simultaneously the mixture is raised within the container and allowed to flow by gravity over a number of degassing elements. Each degassing element is provided with a sharp edge. The surface of the resin mixture is stretched to overcome the surface tension and thereby facilitate the escape of air or gas bubbles entrained within the mixture.

Figure 2:
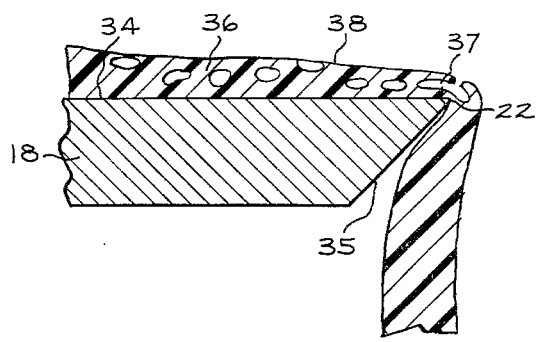

For a better understanding of my invention, reference may be had to the accompanying drawings in which:

FIGURE 1 is an elevational view of one embodiment of my invention partly in cross-section, and FIGURE 2 is an enlarged partial elevational view in cross-section of one of the degassing elements of FIGURE 1 illustrating the stretching and degassing effect on a resin mixture flowing thereover.

As best seen in FIGURE 1, a mixing and degassing chamber 1 is constructed with a lower member or receptacle 2 and a cover 3. An air-tight gasket 4 is provided at the juncture between the receptacle 2 and cover 3. An exhaust tube 5 communicates with the interior of the chamber 1 through the cover 3 and connects the chamber 1 to a vacuum pump (not shown).

In order to heat the chamber 1 and its contents an outer wall 6 is provided around the receptacle 2, forming a steam compartment 7. A controlled amount of steam is admitted to the steam compartment 7 from any suitable steam source. The steam source and regulating mechanism are not shown since they do not form a part of my invention.

In order to mix material contained within the chamber 1 an agitator 8 is mounted adjacent the bottom of the receptacle 2 and is rotatably supported by means of a vertical shaft 9 which extends outwardly through the cover 3. The vertical shaft is connected to a power source (not shown) by means of a power shaft 10. The vertical shaft 9 and power shaft 10 are physically connected by a coupling member 11 so that rotation of the power source will be transmitted through the power shaft 10 and coupling member 11 to the vertical shaft 9 for rotation of the agitator 8.

In addition to mixing, it is necessary that the epoxy resin mixture contained within the chamber 1 be degassed in order to remove entrained bubbles of air or gas. Reduction of the pressure within the chamber 1 is sufficient to cause bubbles located adjacent the surface of the epoxy resin to rise to the surface and escape. However, in order to have an economically efficient operation relatively large amounts of epoxy resin must be mixed and degassed in a single operation; therefore, it is usually necessary to fill a substantial portion of the chamber 1 such as providing epoxy resin to the level shown by numeral 12. Under this condition the bubbles of air or gas which are entrained below the surface of the epoxy resin are under sufficient static pressure, due to the height of the fluid above them, that the evacuation of the chamber does not result in a sufficient drop in pressure to cause these bubbles to rise to the surface and escape.

In order to overcome this difficulty and insure that the degassing takes place, the vertical shaft 9 is surrounded by a tubular member 13. The lower end 14 of the tubular member 13 opens slightly above the agitator 8 while the upper end 15 terminates well above the epoxy resin level 12. A screw member 16 disposed around the vertical shaft 9 and within the tubular member 13 serves to draw epoxy resin upwardly through the tubular member 13 where it is discharged through the upper end 15. The epoxy resin discharged through the upper end 15 flows downwardly under the influence of gravity.

In accordance with my invention a degassing apparatus 17 is provided to take advantage of this gravity actuated movement in order to eliminate entrained air and gas. The degassing apparatus comprises a series of degassing plates or members 18, 19, 20 and 21 which are vertically spaced between the upper end 15 of the tubular member 13 and the epoxy resin level 12. The degassing members 18 and 20 are annular in shape and their inner edges are attached to the tubular member 13, thus forcing epoxy resin which impinges upon them to flow over their outer edges 22 and 23 respectively. Degassing member 18 may be supported from cover 3 by vertical supports 23a and 23b.

The degassing member 19 is also annular in shape; however, it is spaced outwardly from the tubular member 13 and is positioned between the degassing members 18 and 20. The degassing member 19 is held in place by means of vertical supports such as 24 and 25 which extend from the lower surface of degassing member 18 to the upper surface of degassing member 19. The degassing member 19 is provided with a flat portion 26 surrounded by a vertical wall portion 27, thus forcing epoxy resin falling upon the degassing member 19 to flow over its inner edge 28. Similarly the degassing member 21 is spaced from the tubular member 13 and is supported between the degassing member 20 and the epoxy resin level 12 by means of vertical supports such as 29 and 30. The degassing member 21 is also provided with a flat portion 31 surrounded by a vertical wall portion 32, forcing fluid epoxy resin falling upon the degassing member 21 to flow over its inner edge 33. By forcing the epoxy resin to flow first over an outer edge and then an inner edge of vertically spaced members, multiple degassing actions may be obtained with an apparatus which is not of an excessive diameter.

FIGURE 2 shows a partial elevational view of degassing member 18 in cross-section more clearly to illustrate the exact shape and function of the degassing members 18, 19, 20 and 21. The degassing member 18 is provided with a planar upper surface 34 and a side wall 35 which is undercut to form a sharp outer edge 22. It will be understood that by undercut I mean that the angle between the planar surface 34 and the side wall 35 taken through the degassing member 18 is less than 90°.

As the epoxy resin 36, having air or gas bubbles such as 37 entrained therein, flows over the planar surface 34 and around the edge 22 it will tend to adhere to the side wall 35. This action results in the outer surface 38 of epoxy resin 36 being stretched at the edge 22. Such stretching results in the shear forces of the flow overcoming the surface tension of the epoxy resin 36, thereby tearing open a part of the surface confining the entrained air or gas bubbles and allowing them to escape, as shown by the bubble 37.

It will be understood that the degassing member 18 was chosen for FIGURE 2 for illustrative purposes only and that a similar construction is also provided along the outer edge 23 of degassing member 20 and the inner edges 28 and 33 of degassing members 19 and 21 respectively.

It will also be understood that a substantially vertical side wall may be used in place of the undercut side wall (illustrated at 35). However, the use of an undercut side wall to provide a sharper edge results in substantially improved performance. It was found that undercutting the side wall 15° resulted in reducing the time of the degassing operation by a factor of four where the other parameters such as batch size, pressure, and temperatures were maintained constant.

Since the fillers often used with epoxy resins are abrasive in nature it may be advantageous to form the edges 22, 23, 28, and 33 from a tungsten carbide material in order to reduce wear and thereby maintain the appropriate amount of undercutting for longer life.

In operation of the above-described invention, epoxy resin to be mixed and the appropriate fillers are inserted in the receptacle 2 and the cover 3 is put in place. Thereafter steam is admitted in the steam compartment 7 and the pressure within the chamber 1 is reduced. The power shaft 10 is rotated by means of a power source in order to turn the vertical shaft 9, thereby causing the agitator 8 attached to the lower end of vertical shaft 9 to revolve to effect mixing of the epoxy resin and the filler constituents. The rotation of the vertical shaft 9 simultaneously results in the vertical screw 16 raising a column of filled epoxy resin to the upper end 15 of the tubular member 13 where the epoxy resin then flows downwardly over the degassing members 18, 19, 20 and 21 under the influence of gravity. As the epoxy resin flows over the degassing members 18, 19, 20 and 21 it flows around the edges 22, 23, 28 and 33 thus undergoing stretching at the surface and allowing entrained air or gas bubbles to escape. This combined mixing and degassing operation is continued until the constituents are thoroughly mixed and degassed.

While I have shown the preferred embodiment of my invention, I do not desire my invention to be limited to the particular construction shown and I intend the appended claims to cover all modifications within the spirit and scope of my invention.

What I claim as new and desire to secure by Letters Patent of the United States is:

1. A fluid degassing apparatus including:
   (a) an evacuated chamber to receive a body of fluid,
   (b) a degassing member mounted in said evacuated chamber above the level of said fluid, and
   (c) means for delivering fluid from said body of fluid to said degassing member for gravity flow thereover,
   (d) said degassing member comprising a planar flow surface, and a side wall extending downwardly from said planar surface at an angle not greater than a right angle to said planar surface to guide fluid flowing over said degassing member,
   (e) said planar surface and said side wall forming a sharp edge for effecting stretching of the surface of said fluid whereby the surface tension of said fluid is overcome and escape of gas entrained in said fluid is facilitated.

2. The apparatus defined in claim 1 further comprising means in the lower portion of said chamber to mix said fluid.

3. An apparatus to degas a viscous epoxy resin including:
   (a) an evacuated chamber to receive a body of resin,
   (b) a degassing member mounted in said evacuated chamber, and
   (c) means for delivering exopy resin from said body of resin to said degassing member for gravity flow thereover,
   (d) said degassing member comprising a planar flow surface and a side wall extending downwardly from said planar surface at an acute angle to said planar surface to guide said resin flowing over said degassing member,
   (e) said planar surface and said side wall forming a sharp edge for effecting stretching of the surface of said resin whereby the surface tension of said resin is overcome and escape of gas entrained in said resin is facilitated.

4. An apparatus to degas a viscous epoxy resin including:
   (a) an evacuated chamber to receive a body of resin,
   (b) a degassing structure mounted in said evacuated chamber and including a plurality of members, and
   (c) means for delivering epoxy resin from said body of resin to said degassing structure for gravity flow successively over said members,
   (d) each of said members comprising a planar flow surface and a side wall extending downwardly from said planar surface at an acute angle to said planar surface to guide resin over said members,
   (e) said planar surface and said side wall forming a sharp edge for effecting stretching of the surface of said resin whereby the surface tension of said resin is overcome and escape of the gas entrained in said resin is facilitated.

5. An apparatus to degas a viscous epoxy resin including:
   (a) an evacuated chamber to receive a body of resin,
   (b) a degassing structure mounted in said evacuated chamber and including a plurality of degassing members, and
   (c) means for delivering epoxy resin from said body of resin to said degassing structure for gravity flow thereover,
   (d) each of said members comprising a planar flow surface and a side wall extending downwardly from said planar surface at an acute angle to said planar surface to guide resin flowing over said degassing member,
   (e) said planar surface and said side wall forming a sharp edge for effecting stretching of the surface of said resin to overcome the surface tension of said resin and thereby facilitate the escape of gas entrained therein, (f) said degassing members being vertically spaced apart so that said resin will flow over them successively thereby being subjected to a plurality of stretching actions to accomplish removal of the entrained gas.

6. A fluid mixing and degassing apparatus including:
(a) an evacuated chamber to receive a body of fluid,
(b) an agitator mounted in the lower portion of said chamber to agitate said fluid for mixing thereof,
(c) a degassing structure mounted in said evacuated chamber above the level of said fluid, said structure including a plurality of degassing members, and
(d) vertical screw means for delivering fluid from said body of fluid to said degassing structure for gravity flow thereover,
(e) each of said members comprising a planar flow surface and a side wall extending downwardly from said planar surface at an acute angle to said planar surface to guide fluid flowing over said degassing member,
(f) said degassing members being vertically spaced apart so that said fluid will flow over them in sequence thereby being subjected to a plurality of stretching actions to accomplish removal of the entrained gas.

References Cited by the Examiner
UNITED STATES PATENTS

| | | | |
|---|---|---|---|
| 1,499,710 | 7/1924 | Weosgerber | 55—206 |
| 1,667,139 | 4/1928 | Borden | 55—206 |
| 2,107,625 | 2/1938 | Bettis | 55—199 |
| 2,183,763 | 12/1939 | Brown | 55—192 |

REUBEN FRIEDMAN, *Primary Examiner.*

C. N. HART, *Assistant Examiner.*